US008750798B2

(12) United States Patent
Rao et al.

(10) Patent No.: US 8,750,798 B2
(45) Date of Patent: Jun. 10, 2014

(54) MULTIPLE INPUT MULTIPLE OUTPUT ANTENNA MODULE AND ASSOCIATED METHOD

(75) Inventors: Qinjiang Rao, Ottawa (CA); James Paul Warden, Irving, TX (US); Mina Ayatollahi, Waterloo (CA)

(73) Assignee: BlackBerry Limited, Waterloo (CA)

( * ) Notice: Subject to any disclaimer, the term of this patent is extended or adjusted under 35 U.S.C. 154(b) by 168 days.

(21) Appl. No.: 12/834,675

(22) Filed: Jul. 12, 2010

(65) Prior Publication Data

US 2012/0009884 A1 Jan. 12, 2012

(51) Int. Cl.
*H04B 7/10* (2006.01)
(52) U.S. Cl.
USPC ...... 455/41.2; 455/575.7; 455/41.1; 455/525; 455/90.3; 455/575.1; 455/550.1; 455/277.1; 455/63.1; 455/296; 343/850; 343/700; 343/702; 343/812; 343/722; 370/278; 370/328; 370/430
(58) Field of Classification Search
USPC ............... 455/575.7, 41.1, 525, 90.3, 575.1, 455/550.1, 277.1, 63.1, 296, 41.2; 343/850, 343/700, 702, 812, 722; 370/278, 328, 430
See application file for complete search history.

(56) References Cited

U.S. PATENT DOCUMENTS

| 6,031,503 | A | 2/2000 | Preiss, II | |
|---|---|---|---|---|
| 6,184,833 | B1 * | 2/2001 | Tran | 343/702 |
| 6,204,819 | B1 * | 3/2001 | Hayes et al. | 343/702 |
| 6,381,471 | B1 | 4/2002 | Dvorkin | |
| 6,426,723 | B1 | 7/2002 | Smith et al. | |
| 6,448,932 | B1 | 9/2002 | Stoiljkovic et al. | |
| 6,894,647 | B2 | 5/2005 | Jenwatanavet | |
| 7,023,387 | B2 * | 4/2006 | Wen et al. | 343/700 MS |
| 7,352,327 | B2 * | 4/2008 | Yeh et al. | 343/700 MS |
| 7,369,092 | B1 | 5/2008 | Wen et al. | |
| 8,111,640 | B2 * | 2/2012 | Knox | 370/278 |
| 8,384,600 | B2 * | 2/2013 | Huang et al. | 343/700 MS |
| 8,390,519 | B2 | 3/2013 | Wang et al. | |
| 2004/0157637 | A1 * | 8/2004 | Steer et al. | 455/525 |
| 2006/0109191 | A1 | 5/2006 | Shtrom et al. | |
| 2008/0079644 | A1 * | 4/2008 | Cheng | 343/769 |
| 2008/0182512 | A1 * | 7/2008 | Waters | 455/41.1 |

(Continued)

FOREIGN PATENT DOCUMENTS

CA 2727102 7/2011
EP 1237225 A1 4/2002

(Continued)

OTHER PUBLICATIONS

EPO, Communication Pursuant to Article 94(3) EPC, Application No. 10169286.1, Oct. 14, 2011, 8 pgs.

(Continued)

*Primary Examiner* — Edward Urban
*Assistant Examiner* — Ganiyu A Hanidu
(74) *Attorney, Agent, or Firm* — The Danamraj Law Group, P.C.

(57) ABSTRACT

A multiple input multiple output (MIMO) antenna module, comprising a first signal feed port coupled to a first antenna element disposed along a first edge of an antenna array board, a second signal feed port coupled to a second antenna element disposed on the antenna array board and a transceiver operable to be selectively coupled to either or both of the first and second signal feed ports.

10 Claims, 6 Drawing Sheets

(56) References Cited

U.S. PATENT DOCUMENTS

| | | | |
|---|---|---|---|
| 2008/0198082 A1* | 8/2008 | Soler Castany et al. | 343/770 |
| 2008/0284661 A1* | 11/2008 | He | 343/700 MS |
| 2008/0297419 A1 | 12/2008 | Dou et al. | |
| 2009/0010316 A1 | 1/2009 | Rofougaran | |
| 2009/0153411 A1* | 6/2009 | Chiang et al. | 343/702 |
| 2009/0213011 A1 | 8/2009 | Tsai et al. | |
| 2009/0251381 A1 | 10/2009 | Chou et al. | |
| 2011/0163922 A1* | 7/2011 | Wang et al. | 343/702 |
| 2013/0135153 A1 | 5/2013 | Wang et al. | |

FOREIGN PATENT DOCUMENTS

| | | |
|---|---|---|
| EP | 2003728 | 12/2008 |
| EP | 2117075 | 11/2009 |
| EP | 2230717 | 9/2010 |
| EP | 2262053 | 12/2010 |
| EP | 2320520 | 5/2011 |
| EP | 2346113 | 7/2011 |
| EP | 2408062 | 1/2012 |
| WO | 2011064444 | 6/2011 |
| WO | 2011105650 A1 | 9/2011 |
| WO | 2012008946 | 1/2012 |
| WO | 2013012403 | 1/2013 |
| WO | 2013012404 | 1/2013 |

OTHER PUBLICATIONS

EP Extended Search Report, Application No. 10169286.1, European Patent Office, Oct. 13, 2010, 13 pgs.
PCT Search Report and Written Opinion, Application No. PCT/US2010/041747, European Patent Office, Oct. 13, 2010, 20 pgs.
Qinjiang Rao et al, "Compact Low Coupling Dual—Antennas for MIMO Applications in Handheld Devices," Research in Motion, IEEE Symposium, Jun. 1, 2009, 4 pgs.
EPO, Brief Communication, Application No. 10169286, Jan. 25, 2013, 6 pgs.
EPO, Decision to Refuse a European Patent Application, Application No. 10169286, Feb. 14, 2013, 24 pgs.
EPO, Provision of the Minutes in Accordance with Rule 124(4) EPC, Application No. 10169286, Feb. 14, 2013, 16 pgs.
KIPO, Office Action, Application No. 10-2011-0001441, Dec. 21, 2011, 3 pgs.
KIPO, Notice of Decision for Patent, Application No. 10-2011-0001441, Jul. 10, 2012, 3 pgs.
USPTO, Office Action, U.S. Appl. No. 12/683,965, Jun. 20, 2012, 7 pgs.
USPTO, Office Action, U.S. Appl. No. 12/683,965, Oct. 25, 2012, 7 pgs.
USPTO, Notice of Allowance, U.S. Appl. No. 12/683,965, Dec. 26, 2012, 5 pgs.
Geyi et al., "Handset Antenna Design: Practice and Theory," Progress in Electromagnetics Research, PIER 80, 2008, pp. 123-160.
Wang et al., "Patch Loaded Tri-Monopole Wideband Antenna for Mobile Applications," ICUWB, 2009, 3 pgs.
Yestrebsky, Tom, "MICRF001 Antenna Design Tutorial," Micrel, Application Note 23, Jul. 1999, 8 pgs.
EPO, Summons to Attend Oral Proceedings Pursuant to Rule 115(1) EPC, Application No. 10169286.1, Oct. 18, 2012, 6 pgs.
SIPO, Office Action, Application No. 201110005935.5, Sep. 6, 2013, 6 pgs.
USPTO, Office Action, Application No. 13751521, Oct. 1, 2013, 9 pgs.
EPO, Extended Search Report, Application No. 11150282.9, Nov. 7, 2013, 6 pgs.
PCT, Notification of Transmittal of the International Preliminary Report on Patentability, Application No. PCT/US2011/044117, Nov. 11, 2013, 15 pgs.
PCT, Notification of Transmittal of the International Preliminary Report on Patentability, Application No. PCT/US2011/044119, Nov. 11, 2013, 16 pgs.
CIPO, Office Action, Application No. 2,727,102, May 24, 2013, 2 pgs.
PCT, Search Report and Written Opinion, Application No. PCT/US2011/044117, Mar. 28, 2012, 13 pgs.
PCT, Notification Concerning Publicaton, Application No. PCT/US2011/044117, Jan. 24, 2013, 1 pg.
PCT, Written Opinion, Application No. PCT/US2011/044117, Jun. 14, 2013, 6 pgs.
PCT, Search Report and Written Opinion, Application No. PCT/US2011/044119, Mar. 28, 2012, 14 pgs.
PCT, Notification Concerning Publicaton, Application No. PCT/US2011/044119, Jan. 24, 2013, 1 pg.
PCT, Written Opinion, Application No. PCT/US2011/044119, Jun. 14, 2013, 8 pgs.
SIPO, First Office Action, Application No. 201110005935.5, Apr. 2, 2013, 9 pgs.
USPTO, Notice of Publication, U.S. Appl. No. 13/751,521, May 30, 2013, 1 pg.
Karaboikis et al., "Compact Dual-Pritned Inverted-F Antenna Diversity System for Portable Wireless devices," IEEE Antennas and Wireless Propagation Letters, vol. 3, 2004, pp. 9-14.
Mavridis et al., "Spatial Diversity Two-Branch Antenna for Wirelss Devices," Electronics Letters, vol. 42, No. 5, Mar. 2, 2006, pp. 266-268.
Plicanic et al., "Actual Diversity Performance of a Multiband Diversity Antenna with Hand and Head Effects," IEEE Transactions on Antennas and Propagation, IEEE Service Center, vol. 57, No. 5, May 1, 2009, pp. 1547-1556.
Rao et al., "A Compact Dual-Port Diversity Antenna for Long-Term Evolution Handheld Devices," IEEE transactions on Vehicular Technology, vol. 59, No. 3, Mar. 2010, pp. 1319-1329.
Rao et al., "Design, Modeling, and Evaluation of a Multiband MIMO/Diversity Antenna System for Small Wireless Mobile Terminals," IEEE Transactions on Components, Packaging, and Manufacturing Technology, vol. 1, No. 3, Mar. 2011, pp. 410-419.
Wen et al., "Compact Multi-feed Multi-Band Antenna Designs for Wireless Mobile Devices," Antenna and Propagation Society International Symposium, 2007, pp. 1036-1039.
USPTO, Office Action, U.S. Appl. No. 13/751,521, Feb. 4, 2014, 8 pgs.
CIPO, Notice of Allowance, Application No. 2,727,102, Dec. 16, 2013, 2 pgs.

* cited by examiner

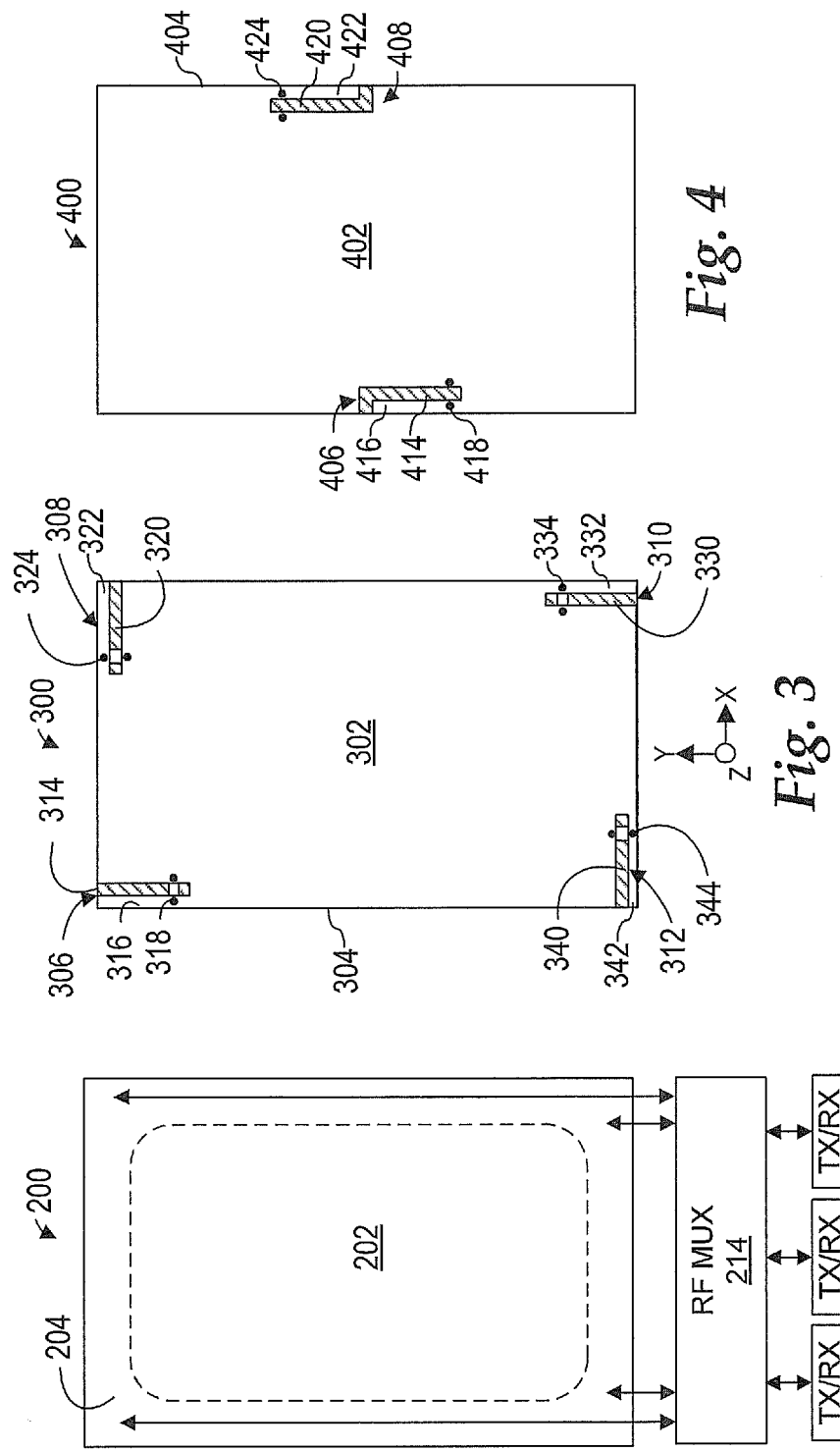

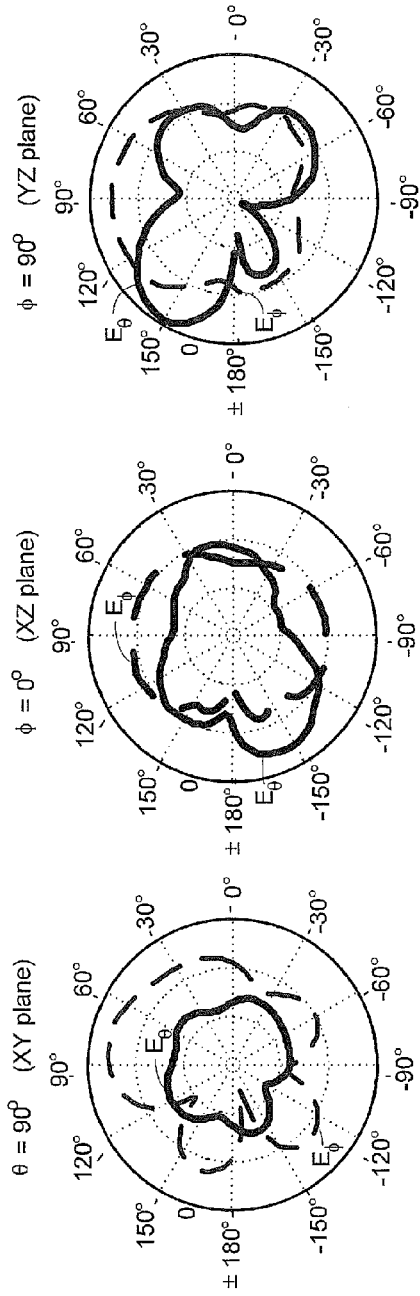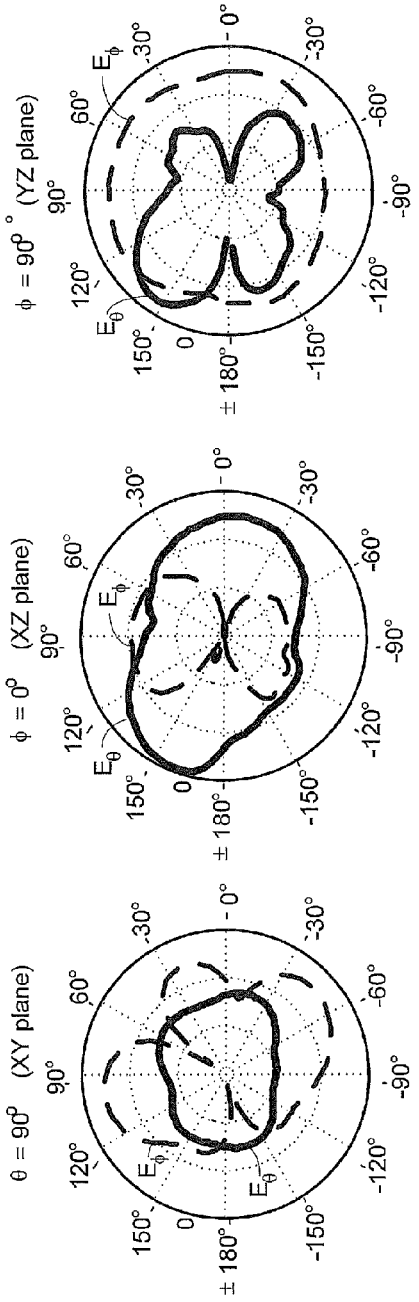

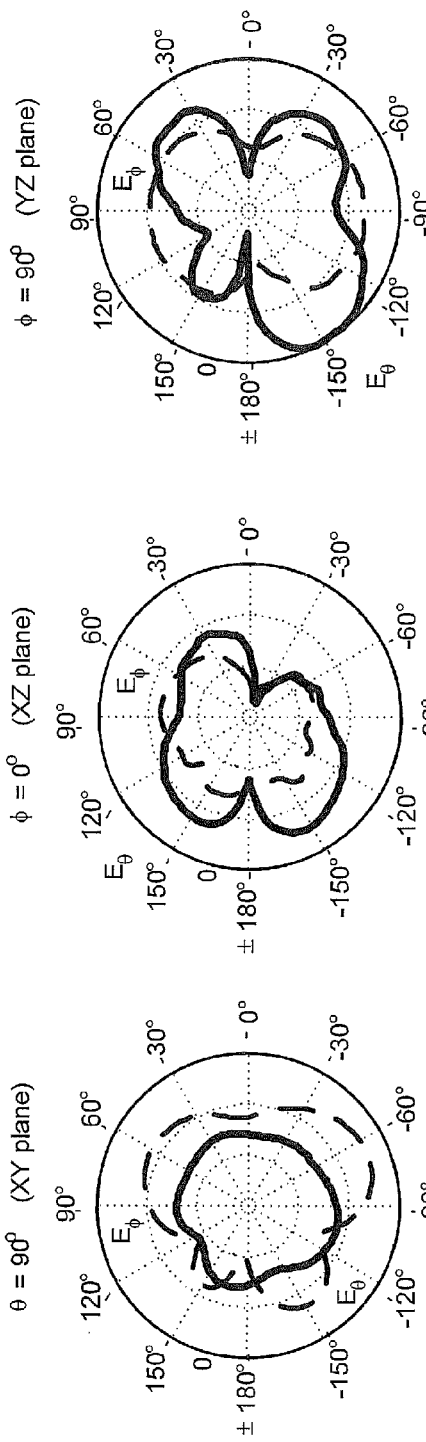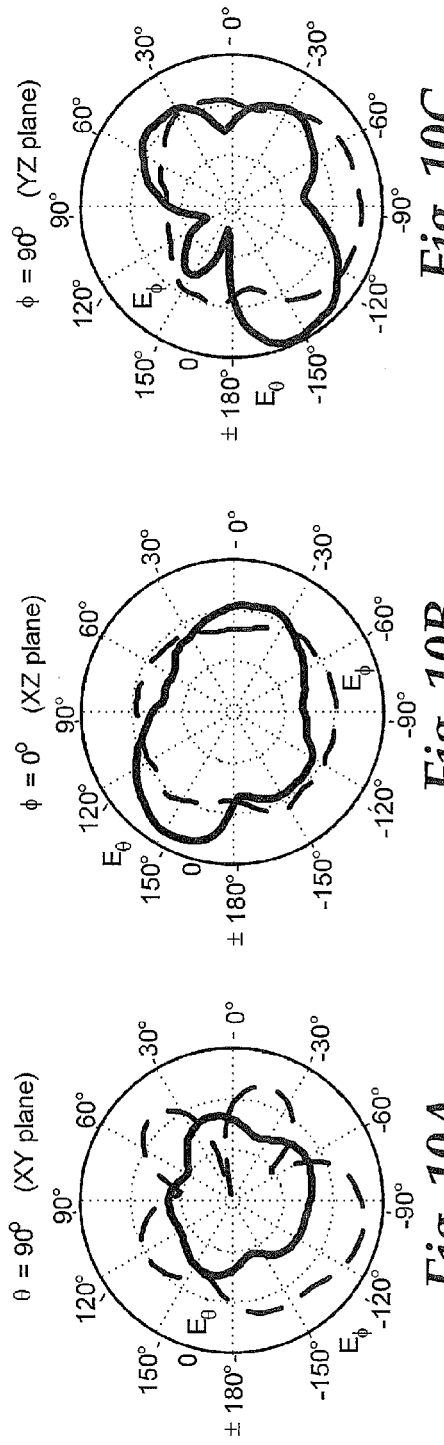

MULTIPLE INPUT MULTIPLE OUTPUT ANTENNA MODULE AND ASSOCIATED METHOD

FIELD OF THE DISCLOSURE

The present patent disclosure generally relates to antennas. More particularly, and not by way of any limitation, the present patent disclosure is directed to a Multiple Input Multiple Output (MIMO) antenna assembly and associated method.

BACKGROUND

Recently, there has been an increasing thrust in the application of internal antennas in wireless communications devices. The concept of an internal antenna stems from the avoidance of using an external radiating element through the integration of the antenna into the communications device itself. Internal antennas have several advantageous features such as being less prone to external damage, a reduction in overall size of the communications device with optimization, and easy portability. In most internal antennas, the printed circuit board of the communications device serves as the ground plane of the internal antenna.

Current antenna solutions for Multiple Input Multiple Output (MIMO) applications require multiple antennas. While multiple antennas provide numerous benefits, they present numerous design challenges, as well. One such challenge is mutual coupling between the antennas, which can result in wasted power when transmitting and a lower received power from incoming signals. In MIMO technologies such as Long Term Evolution (LTE), where two receive antennas are required, cross-coupling effects can be highly undesirable since effective MIMO performance requires relatively low correlation between each of the received signals of the multiple antennas. When multiple antennas are used within a mobile handheld device, the signals received by each of the antennas may be undesirably correlated, due to the tight confines typical of the compact devices that are favored by consumers. This can considerably affect MIMO performance. Accordingly, minimal coupling between antennas in MIMO antenna arrays is preferred to increase system efficiency and battery life, and thereby improve received signal quality. In order to optimize the characteristics of MIMO antenna arrays, a significant level of testing is generally required.

BRIEF DESCRIPTION OF THE DRAWINGS

A more complete understanding of the embodiments of the present patent disclosure may be had by reference to the following Detailed Description when taken in conjunction with the accompanying drawings wherein:

FIG. 2 depicts a MIMO antenna testing module in a schematic representation;

FIG. 3 depicts one example embodiment of a MIMO antenna module in a frontal view representation;

FIG. 4 depicts a second example embodiment of a MIMO antenna module in a frontal view representation;

FIGS. 7A-7C depict E-theta and E-phi patterns for the antenna of FIG. 3 in a first configuration;

FIGS. 8A-8C depict E-theta and E-phi patterns for the antenna of FIG. 3 in a second configuration;

FIGS. 9A-9C depict E-theta and E-phi patterns for the antenna of FIG. 3 in a third configuration; and FIGS. 10A-10C depict E-theta and E-phi patterns for the antenna of FIG. 3 in a fourth configuration.

DETAILED DESCRIPTION OF THE DRAWINGS

Figure 1:
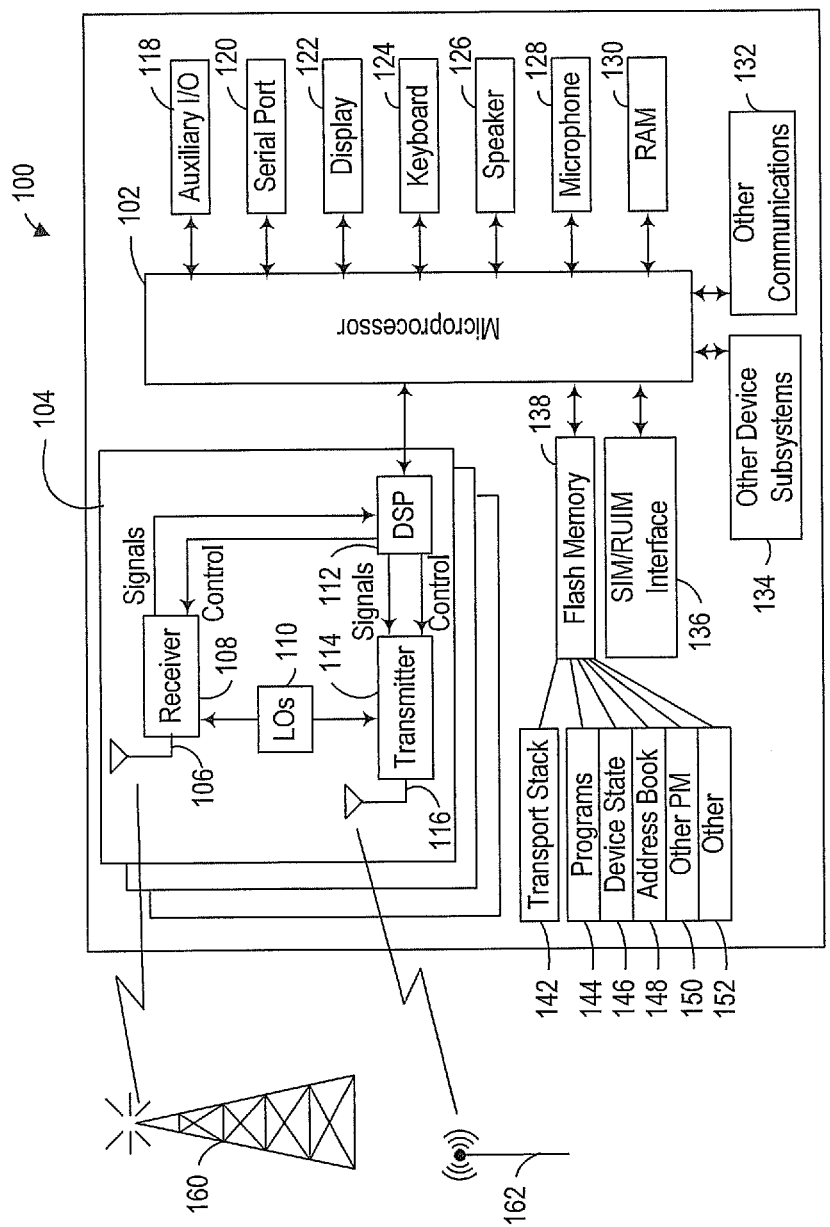
FIG. 1 depicts a functional block diagram of an example wireless user equipment (UE) device suitable for use with a multiple input multiple output (MIMO) antenna module of the present patent application.

The present patent disclosure is broadly directed to various embodiments of a highly optimizable multiple input multiple output (MIMO) antenna module for multiple applications. The MIMO antenna module is particularly well-adapted to efficiently testing a variety of antenna designs in a short period of time, but the teachings herein may be employed within a variety of contexts.

In one aspect, an embodiment of a MIMO antenna module is disclosed which comprises a first signal feed port, coupled to a first antenna element on the antenna array board; a second signal feed port, coupled to a second antenna element, disposed on the antenna array board; and a transceiver operable to be selectively coupled to either or both of the first and second signal feed ports.

In another aspect, a MIMO antenna module of the present disclosure comprises a first antenna element, having a feed port, disposed on a peripheral region of a planar surface; a second antenna element disposed on the peripheral region of the planar surface, having a feed port, disposed on the planar surface; a first transceiver operable to be selectively coupled to either or both of the first and second antenna elements; and a second transceiver operable to be selectively coupled to either or both of the first and second antenna elements.

In another aspect, a method is disclosed for testing a MIMO antenna module comprising an array of antenna elements. The method comprises selecting, from the array of antenna elements, a set of antenna elements for testing; selecting a set of signal parameters; and transmitting a signal meeting the signal parameters via the selected set of antenna elements.

Embodiments of apparatus and associated method relating to a MIMO module or assembly thereof of the present patent disclosure will now be described with reference to various examples of how the embodiments can best be made and used. Like reference numerals are used throughout the description and several views of the drawings to indicate like or corresponding parts to the extent feasible, wherein the various elements may not necessarily be drawn to scale.

As noted, the MIMO antenna modules of the present disclosure are designed to be used with wireless user equipment (UE) devices. Referring now to the drawings, and more particularly to FIG. 1, depicted therein is a functional block diagram of an example wireless UE device 100 suitable for use with the MIMO antenna modules and methods referenced herein. Without any limitation, UE 100 may comprise any mobile communications device that is capable of conducting wireless communications.

UE 100 may be operable with any frequency range or ranges of a wide area cellular network (WACN) technology such as, e.g., a General Packet Radio Service (GPRS) network, an Enhanced Data Rates for Global System for Mobile Communications (GSM) Evolution (EDGE) network, a $3^{rd}$ or $4^{th}$ Generation network, an Integrated Digital Enhanced Network (IDEN), a Code Division Multiple Access (CDMA) network, a Universal Mobile Telecommunications System (UMTS) network, a Universal Terrestrial Radio Access Network (UTRAN), or any Long-Term Evolution (LTE) network. In addition, UE 100 may also effectuate wireless communications in a frequency range or ranges according to such standards as, e.g., the well-known Institute of Electrical and Electronics Engineers (IEEE) standards, like IEEE 802.11a/b/g/n standards or other related standards such as HiperLan standard, HiperLan II standard, Wi-Max standard, OpenAir standard, and Bluetooth standard.

A microprocessor 102 providing for the overall control of UE 100 is operably coupled to a communication subsystem 104, which includes appropriate receivers 108 and transmitters 114 as well as associated components such as antenna elements 106, 116 that can be representative or illustrative of a MIMO antenna module embodiment described hereinbelow. It will be recognized that appropriate GPS receiver circuitry may also be provided as part of the communication subsystem. In addition, communication subsystem 104 may include one or more local oscillator (LO) modules 110 and processing modules such as digital signal processors (DSP) 112, for operating with multiple access technologies in different bands. As will be apparent to those skilled in the field of communications, the particular design of the communication module 104 may be dependent upon the communications network(s) with which the device is intended to operate, e.g., as exemplified by infrastructure elements 160 and 162.

Microprocessor 102 also interfaces with further device subsystems such as auxiliary input/output (I/O) 118, serial port 120, display 122, keyboard 124, speaker 126, microphone 128, random access memory (RAM) 130, other communications facilities 132, which may include for example a short-range communications subsystem, and any other device subsystems generally labeled as reference numeral 134. To support access as well as authentication and key generation, a SIM/RUIM interface 136 is also provided in communication with the microprocessor 102.

Operating system software and other system software may be embodied in a persistent storage module 138 (i.e., non-volatile storage) which may be implemented using Flash memory or another appropriate memory. In one implementation, persistent storage module 138 may be segregated into different areas, e.g., transport stack 142, storage area for computer programs 144, as well as data storage regions such as device state 146, address book 148, other personal information manager (PIM) data 150, and other data storage areas generally labeled as reference numeral 152. Additionally, the persistent memory may include appropriate software/firmware necessary to effectuate communications in conjunction with one or more subsystems set forth herein under control of the microprocessor 102.

FIG. 2 is a schematic diagram illustrating the general concept for a testing apparatus incorporating the MIMO antenna structures of the present disclosure. A generally-rectangular printed circuit board 200 comprises a central region 202 surrounded by a peripheral region 204. According to the teachings set forth in the present disclosure, peripheral region 204 is employed for the placement of multiple antenna elements, while central region 202 may be reserved for other functions. The antenna elements may be disposed within the front plane of the printed circuit board 200, within the edge planes normal to the front plane of the printed circuit board, or both.

The testing apparatus set forth in FIG. 2 incorporates a set of transceivers 208, 210, 212 operably connected to a radio-frequency multiplexer (RF MUX) 214. Using RF MUX 214, any one of transceivers 208, 210, 212 may be operably connected to any one or more of the radiating elements disposed on printed circuit board 200. Transceivers 208, 210, 212 may incorporate circuitry enabling them to generate signals corresponding to the signals required by the application for which the antenna is being employed. Such circuitry may include, but is not limited to, Bluetooth-compatible transceiver circuitry adapted to operate in a 2.4 GHz band, WiFi-compatible transceiver circuitry adapted to operate in the 2.4 GHz band and wide area cellular network (WACN)-compatible transceiver circuitry adapted to operate in a GPS frequency range.

Certain teachings of the present disclosure may be particularly useful in the course of the product development process. Using the apparatus of FIG. 2, varying combinations of radiating elements disposed on printed circuit board 200 may be efficiently tested within a short time frame. In the course of development of an antenna design, it is common practice to develop a theoretical antenna design first, and then proceed to fabricate a prototype and test the prototype under different conditions. Based on the performance of the prototype, the design may be further refined, and one or more subsequent prototypes may be fabricated and tested. The fabrication of multiple rounds of antenna prototypes can add significantly to the antenna design cycle. In order to shorten the antenna design cycle, the present disclosure may be employed to quickly and efficiently test a wide variety of antenna design and configuration options in short order, as set forth in further detail below.

While the present disclosure is particularly well-adapted to testing and development, those of skill in the art will recognize that the teachings of the present disclosure are adaptable to a variety of useful purposes. When incorporated into a mobile communication device such as UE 100 of FIG. 1, certain of the present teachings may be employed to optimize wireless communication characteristics of the UE 100 and thereby optimize performance.

FIG. 3 is a frontal view of an antenna array board 300 incorporating a set of slot elements in its peripheral region. Antenna array board 300 comprises a conductive layer 302 disposed on a non-conductive layer 304. In certain embodiments, the conductive layer 302 may be copper and the non-conductive layer 304 may be a glass-fiber reinforced polymer, although other materials may be used. Antenna array board 300 comprises a first straight slot element 306, a second straight slot element 308, a third straight slot element 310 and a fourth straight slot element 312, each disposed in one of the four corners of the generally-rectangular antenna array board 300. Straight slot elements 306 and 310 are substantially aligned to the left and right edges of antenna array board 300, while straight slot elements 308 and 312 are substantially-aligned to the top and bottom edges of antenna array board 300. Each of the slot elements comprises an extended linear aperture from the front of antenna array board 300 through the conductive layer 302 to the non-conductive layer 304. In certain embodiments, straight slot elements 306, 308, 310, 312 may extend into the non-conductive layer 304, as well.

Straight slot element 306 comprises a straight slot 314 running parallel to the left edge of antenna array board 300 from the top edge of antenna array board 300 toward the center thereof. Straight slot 314 is bounded by a conductive strip 316 disposed between the straight slot 314 and the left edge of antenna array board 300. The width of the conducting strip 316 may be adjusted to optimize antenna resonance frequency and bandwidth. Straight slot element 306 is fed by signal feed port 318 disposed near the end of straight slot 314 furthest from the upper edge of antenna array board 300. Signal feed port 318 comprises a pair of contacts on the conductive layer 302 on opposite sides of straight slot 314.

Straight slot element 308 comprises a straight slot 320 running parallel to the top edge of antenna array board 300 from the right edge of antenna array board 300 toward the center thereof. Straight slot 320 is bounded by a conductive strip 322 disposed between the straight slot 320 and the upper edge of antenna array board 300. Straight slot element 308 is fed by a signal feed port 324 disposed near the end of straight slot 320 furthest from the right edge of antenna array board 300.

Straight slot element 310 comprises a straight slot 330 running parallel to the right edge of antenna array board 300 from the bottom edge of antenna array board 300 toward the center thereof. Straight slot 330 is bounded by a conductive strip 332 disposed between the straight slot 330 and the right edge of antenna array board 300. Straight slot element 310 is fed by a signal feed port 334 disposed near the end of straight slot 330 furthest from the bottom edge of antenna array board 300.

Straight slot element 312 comprises a straight slot 340 running parallel to the bottom edge of antenna array board 300 from the left edge of antenna array board 300 toward the center thereof. Straight slot 340 is bounded by a conductive strip 342 disposed between the straight slot 340 and the bottom edge of antenna array board 300. Straight slot element 312 is fed by a signal feed port 344 disposed near the end of straight slot 340 furthest from the left edge of antenna array board 300.

As will be appreciated by those of skill in the art, the length, width and other characteristics of the slot elements described herein, as well as the optimal placement of the signal feed ports, will be determined according to the design criteria for the antenna array board 300. The dimensions of the slot elements, their shape and their location with respect to the any edge of the antenna array board 300 can be adjusted to optimize the resonance frequency, bandwidth, impedance matching, directivity, and other antenna performance parameters. The length of the slot elements will generally be approximately a quarter of a wavelength of the principal operating frequency for signal for which the element is designed, but may vary according to the particular application. In certain embodiments, corresponding elements may have identical shapes and dimensions, but certain other embodiments may not employ corresponding elements having identical shapes or dimensions. As noted above in connection with FIG. 2, alternate embodiments may include additional elements, either within the front plane of antenna array board 300, within the edge planes normal to the front plane of the printed circuit board, or both. All of these variations are well-known to those of skill in the art of antenna design.

According to the teachings of the present disclosure, one or more of straight slot elements 306, 308, 310, 312 may be selectively coupled to one or more transceivers at a given time, thereby enabling the wireless characteristics of a mobile communication device or other communications apparatus to be varied and optimized according to conditions. This selective coupling may be accomplished by means of diode switches or other technology well-known to those of skill in the art. Those of skill in the art will recognize that there is nothing whatsoever in the spirit and scope of the present disclosure limiting it to use with slot elements, and the teachings of the present disclosure may be employed in connection with a wide variety of antenna element types.

FIG. 4 is a frontal view of an antenna array board 400 incorporating a pair of L-slot elements. Antenna array board 400 comprises a conductive layer 402 disposed on a non-conductive layer 404. In certain embodiments, the conductive layer 402 may be copper and the non-conductive layer 404 may be a glass-fiber reinforced polymer, although other materials may be used. Antenna array board 400 comprises a first L-slot element 406 and a second L-slot element 408. The longer internal leg of each of L-slot elements 406 and 408 is substantially aligned to the parallel left and right edges of antenna array board 300, while the shorter outer legs run perpendicular thereto. Each of the slot elements comprises an extended L-shaped aperture from the front of antenna array board 400 through the conductive layer 402 to the non-conductive layer 404. In certain embodiments, the slot elements may extend into the non-conductive layer 404, as well.

L-slot element 406 comprises an L-slot 414 having a shorter outer segment and a longer inner segment. The outer segment of L-slot 414 runs from, and perpendicular to, the left edge of antenna array board 400 toward the center thereof. The inner segment of L-slot 414 runs perpendicular to the outer segment and parallel to the left edge of antenna array board 400. L-slot 414 is bounded by a conductive strip 416 disposed between the L-slot 414 and the left edge of antenna array board 400. L-slot element 406 is fed by signal feed port 418 disposed near the interior end of L-slot 414.

L-slot element 408 comprises an L-slot 420 having a shorter outer segment and a longer inner segment. The outer segment of L-slot 420 runs from, and perpendicular to, the right edge of antenna array board 400 toward the center thereof. The inner segment of L-slot 420 runs perpendicular to the outer segment and parallel to the right edge of antenna array board 400. L-slot 420 is bounded by a conductive strip 422 disposed between the L-slot 420 and the right edge of antenna array board 400. L-slot element 408 is fed by signal feed port 424 disposed near the interior end of L-slot 414.

As noted above with respect to antenna array panel 300, either or both of L-slot elements 406, 408 may be selectively coupled to one or more transceivers 104 at a given time, thereby enabling the wireless characteristics of a mobile communication device such as UE 100 or other communications apparatus to be varied and optimized according to conditions. As noted above in connection with FIG. 3, those of skill in the art will recognize that there is nothing whatsoever within the spirit and scope of the present disclosure limiting it to use with slot elements, and the teachings of the present disclosure may be employed in connection with a wide variety of antenna element types. As noted above in connection with FIGS. 2 and 3, alternate embodiments may include additional elements, either within the front plane of antenna array board 400, within the edge planes normal to the front plane of the printed circuit board, or both.

Figure 5:
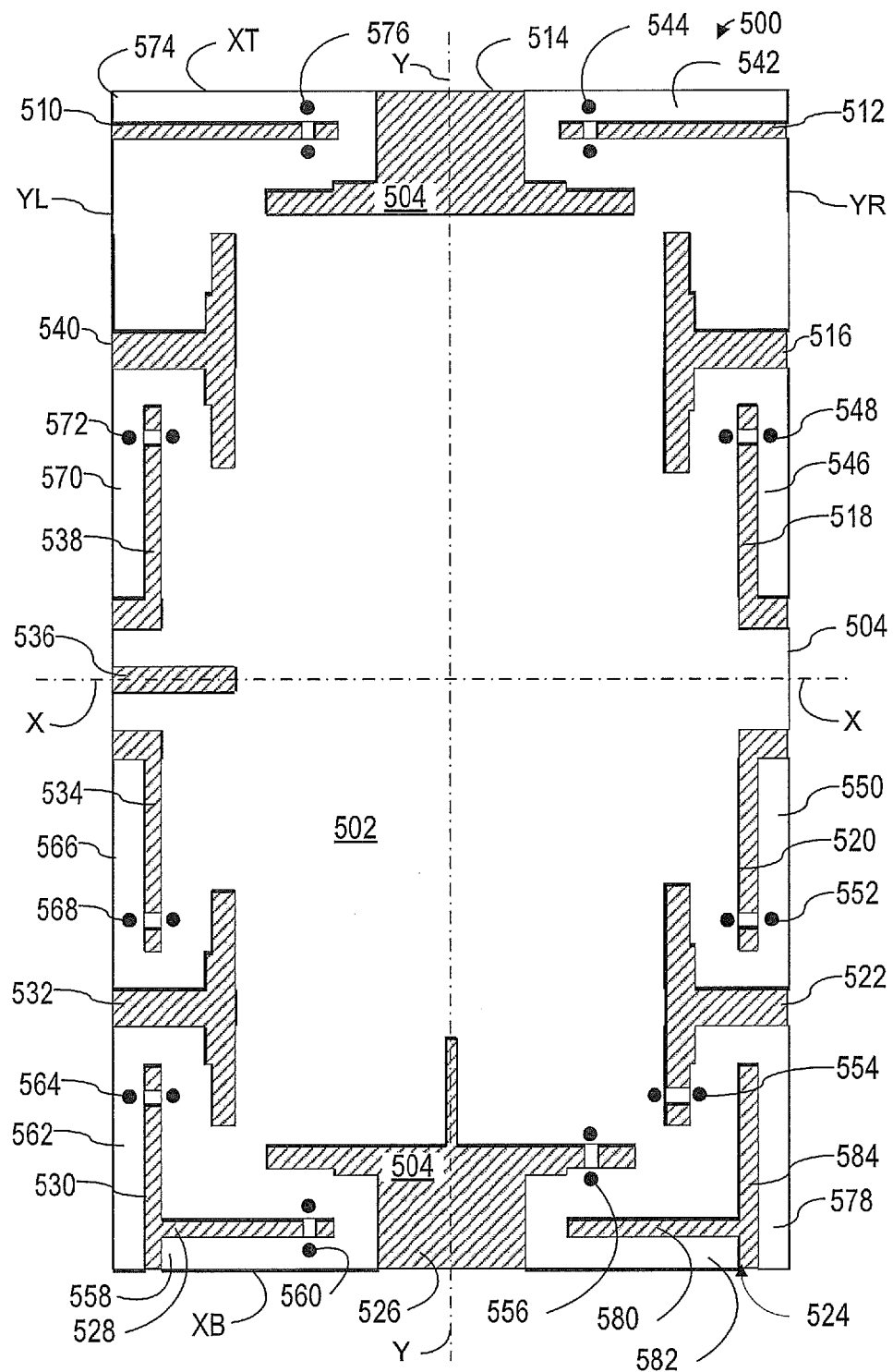
FIG. 5 depicts a third example embodiment of a MIMO antenna module in a frontal view representation.

FIG. 5 is a frontal view of an antenna array board 500 operable to be employed in the apparatus set forth in FIG. 2. Antenna array board 500 comprises a conductive layer 502 disposed on a non-conductive layer 504. In certain embodiments, the conductive layer 502 may be copper and the non-conductive layer 504 may be a glass-fiber reinforced polymer, although other materials may be used. Antenna array board 500 comprises a wide variety of elements, as set forth in detail below. The elements comprise a variety of shaped apertures extending from the front of antenna array board 500 through the conductive layer 502 to the non-conductive layer 504. In certain embodiments, the shaped apertures may extend into the non-conductive layer 504, as well. The rectangular geometry of the antenna array board 500 is substantially defined by peripheral edges YL, YR, XB and XT. Peripheral edges YL and YR run parallel to centerline axis Y, which runs down the center of the antenna array board 500 along its major axis. Peripheral edges XB and XT run parallel to centerline axis X, which runs down the center of the antenna array board 500 along its minor axis and orthogonal to centerline axis Y.

As noted, antenna array board 500 incorporates a wide variety of elements of varying types, and thus is operable to be employed in a wide variety of applications. The elements include straight slots 510, 512, T-slot elements 514, 516, 532, 540, L-slots 518, 520, 534, 538, T-and-slot element 526, Y-slot element 524 and slot element 536.

The upper portion of antenna array board 500 houses two straight slots 510, 512 separated by a T-slot element 514. Straight slot 510 runs parallel to the upper edge of antenna array board 500 from the left edge of antenna array board 500 toward the center thereof. Straight slot 510 is bounded by a conductive strip 574 disposed between the straight slot 510 and the upper edge of antenna array board 500. Straight slot 510 is fed by a signal feed port 576 disposed near the inboard end of straight slot 510 furthest from the left edge of antenna array board 500.

Straight slot 512 runs parallel to the upper edge of antenna array board 500 from the right edge of antenna array board 500 toward the center thereof. Straight slot 512 is bounded by a conductive strip 542 disposed between the straight slot 512 and the upper edge of antenna array board 500. Straight slot 512 is fed by a signal feed port 544 disposed near the inboard end of straight slot 512 furthest from the right edge of antenna array board 500.

T-slot element 514 is interposed between straight slot 510 and straight slot 512 along the upper edge of antenna array board 500. T-slot element 514 extends from the upper edge of antenna array board 500 to a point below straight slots 510, 512. T-slot element 514 is narrower in the region immediately between straight slots 510, 512 and wider in the region below straight slots 510, 512.

A pair of L-slots 518, 520 and a pair of T-slot elements 516, 522 are disposed along the right edge of antenna array board 500. L-slot 518 incorporates a shorter outer segment and a longer inner segment. The outer segment of L-slot 518 runs from the right edge of antenna array board 500 toward the center thereof. The inner segment of L-slot 518 runs perpendicular to the outer segment and parallel to the right edge of antenna array board 500. L-slot 518 is bounded by a conductive strip 546 disposed between the L-slot 518 and the right edge of antenna array board 500. L-slot 518 is fed by a signal feed port 548 disposed near the upper end of L-slot 518.

Similarly to L-slot 518, L-slot 520 also incorporates a shorter outer segment and a longer inner segment. The outer segment of L-slot 520 runs from the right edge of antenna array board 500 toward the center thereof. The inner segment of L-slot 520 runs perpendicular to the outer segment and parallel to the right edge of antenna array board 500. L-slot 520 is bounded by a conductive strip 550 disposed between the L-slot 520 and the right edge of antenna array board 500. L-slot 520 is fed by a signal feed port 552 disposed near the lower end of L-slot 520.

T-slot element 516 is interposed between L-slot 518 and straight slot 512 along the right edge of antenna array board 500. T-slot element 514 extends from the right edge of antenna array board 500 to a point inside of the innermost extents of L-slots 518, 520. T-slot element 516 is narrower in the region adjacent to L-slot 518 and wider in the region inside of the inward extent of L-slot 518.

T-slot element 522 is interposed between L-slot 520 and Y-slot element 524 along the right edge of antenna array board 500. T-slot element 514 extends from the right edge of antenna array board 500 to a point inside of the innermost extents of L-slots 518, 520. T-slot element 522 is narrower in the region adjacent to L-slot 520 and wider in the region inside of the inward extent of L-slot 520. Those of skill in the art will note that T-slot element 522 incorporates a signal feed port 554 adjacent to the lower end of the aperture.

A pair of L-slots 534, 538, a pair of T-slot elements 532, 540 and a straight slot element 536 are disposed along the left edge of antenna array board 500. L-slot 534 incorporates a shorter outer segment and a longer inner segment. The outer segment of L-slot 534 runs from the left edge of antenna array board 500 toward the center thereof. The inner segment of L-slot 534 runs perpendicular to the outer segment and parallel to the left edge of antenna array board 500. L-slot 534 is bounded by a conductive strip 566 disposed between the L-slot 534 and the left edge of antenna array board 500. L-slot 534 is fed by a signal feed port 568 disposed near the lower end of L-slot 534.

L-slot 538 incorporates a shorter outer segment and a longer inner segment. The outer segment of L-slot 538 runs from the left edge of antenna array board 500 toward the center thereof. The inner segment of L-slot 538 runs perpendicular to the outer segment and parallel to the left edge of antenna array board 500. L-slot 538 is bounded by a conductive strip 570 disposed between the L-slot 538 and the left edge of antenna array board 500. L-slot 538 is fed by a signal feed port 572 disposed near the lower end of L-slot 538.

T-slot element 532 is interposed between L-slot 534 and Y-slot element 528 along the left edge of antenna array board 500. T-slot element 532 extends from the left edge of antenna array board 500 to a point inside of the innermost extents of L-slots 534, 538. T-slot element 532 is narrower in the region adjacent to L-slot 534 and wider in the region inside of the inward extent of L-slot 534.

T-slot element 540 is interposed between L-slot 538 and straight slot 510 along the left edge of antenna array board 500. T-slot element 540 extends from the left edge of antenna array board 500 to a point inside of the innermost extents of L-slots 534, 538. T-slot element 540 is narrower in the region adjacent to L-slot 538 and wider in the region inside of the inward extent of L-slot 538.

Straight slot element 536 is interposed between L-slots 534, 538. Straight slot element 536 extends perpendicularly inward from the left edge of antenna array board 500 toward the center thereof. In the embodiment shown in FIG. 5, straight slot element 536 extends into antenna array panel 500 approximately the same distance as T-slot elements 532, 540 extend into antenna array panel 500.

A pair of Y-shaped elements 528, 530 and T-and-slot element 526 are disposed along the lower edge of antenna array board 500. Y-shaped element 524 comprises vertical segment 584 and horizontal segment 580. Vertical segment 584 extends up perpendicularly from the bottom edge of antenna array board 500, parallel to the right edge of antenna array board 500. Vertical segment 584 is separated from the right edge of the antenna array board 500 by conductive strip 578. Horizontal segment 580 extends inward from the vertical segment 584 and parallel to the lower edge of antenna array board 500. Horizontal segment 580 is separated from the lower edge of antenna array board 500 by conductive strip 582.

Y-shaped element 528 comprises vertical segment 530 and horizontal segment 586. Vertical segment 530 extends up perpendicularly from the bottom edge of antenna array board 500, parallel to the left edge of antenna array board 500. Vertical segment 530 is separated from the left edge of the antenna array board 500 by conductive strip 562. Signal feed port 564 is disposed at the upper end of vertical segment 530. Horizontal segment 586 extends inward from vertical segment 530 and parallel to the lower edge of antenna array board 500. Horizontal segment 586 is separated from the lower edge of antenna array board 500 by conductive strip 558. Signal feed port 560 is disposed at the inboard end of horizontal segment 586.

Those of skill in the art will appreciate that the particular elements depicted in FIG. 5 have similar geometry, and thus are likely designed for use with similar frequency ranges. Of course, those of skill in the art will also recognize that there is nothing within the spirit and scope of the present disclosure necessitating such geometry. Alternate embodiments may employ a variety of antenna elements having geometry optimized for a corresponding variety of frequency ranges. Those of skill in the art will appreciate that antenna elements placed in close proximity and sharing common polarity may interfere with antenna performance. In order to minimize or eliminate interference between similar elements, antenna array board 500 makes use of design features providing various types of diversity, including spatial diversity and polarization diversity to enhance antenna performance. Spatial diversity may be achieved by placing similar elements on opposite edges of antenna array board 500. Polarization diversity may be achieved by aligning the polarization of the elements with the edges along which they run. Using these three design strategies in concert with others known to those of skill in the art, an optimal antenna design may be achieved.

The antenna elements described above are disposed within the front plane of the antenna array board 500, but those of skill in the art will recognize that antenna elements may be disposed within the edge planes normal to the front plane of the printed circuit board, as well. As noted above in connection with FIGS. 3 and 4, those of skill in the art will recognize that there is nothing whatsoever within the spirit and scope of the present disclosure limiting it to use with any particular style or type of antenna elements, and the teachings of the present disclosure may be employed in connection with a wide variety of antenna element types. As above with respect to antenna array panels 300, 400, at least certain of the elements disposed on antenna array panel 500 may be selectively coupled to one or more transceivers 104 at a given time, thereby enabling the wireless characteristics of a mobile communication device such as UE 100 or other communications apparatus employing antenna array board 500 to be widely varied and optimized according to conditions. In certain embodiments, this coupling may be effectuated on both the transmit and receive sides.

Figure 6:
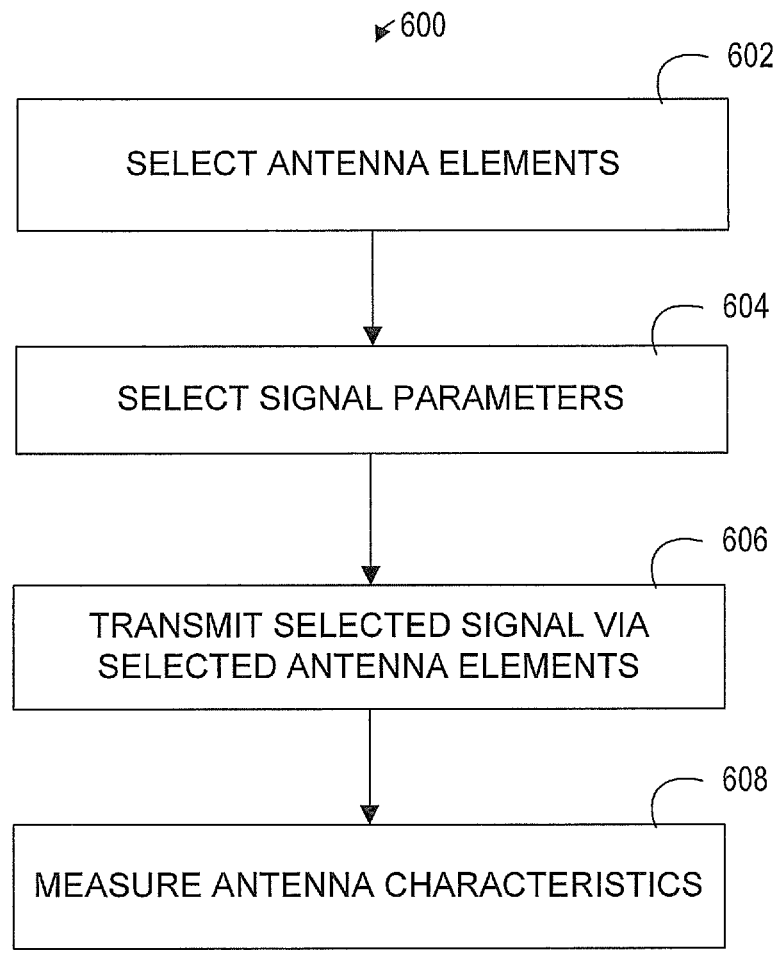
FIG. 6 depicts a flowchart showing certain steps performed in the process of testing a MIMO antenna module.

FIG. 6 is a flowchart of an example method 600 of the present patent application with respect to testing a MIMO module in one embodiment. First, a set of antenna elements is selected (block 602). After the set of antenna elements is selected, signal parameters are selected (block 604). The signal parameters may include, but are not limited to, frequency, amplitude and phase. After the antenna elements and signal parameters are selected, a signal having the selected signal parameters is transmitted via the selected antenna elements (block 606). Various antenna characteristics are then recorded according to the observed performance of the selected antenna elements under the selected conditions (block 608).

The general method set forth in FIG. 6 may be employed to efficiently generate substantial amounts of measurement data in a short period of time. FIGS. 7A-10C depict measured radiation patterns associated with the four slot elements 306, 308, 310, 312 of antenna array board 300 depicted in FIG. 3. These patterns are intended to represent the types of data which can be generated via the use of the teachings of the present disclosure. The convention employed in the following patterns is as identified by the coordinate datum of FIG. 3. The X-axis is aligned to the top and bottom edges of antenna array board 300, the Y-axis is aligned to the right and left edges of antenna array board 300, and the Z-axis extends orthogonal to the front surface of antenna array board 300. The same convention is used for each of FIGS. 7A-10C.

FIGS. 7A-7C depict two-dimensional E-theta and E-phi patterns for straight slot element 306 of FIG. 3 under certain conditions. FIG. 7A depicts a chart showing two-dimensional E-theta and E-phi patterns for straight slot element 306 of FIG. 3 under certain conditions in the XY plane (theta=90 degrees). In the graph shown, the outer extent of the graph represents a signal level of 0 dB, while the first and second reference dotted lines represent signal levels of −10 dB and −20 dB, respectively. The same convention is used in each of FIGS. 7A-10C. It can be seen in FIG. 7A that the E-theta pattern is relatively attenuated, while the E-phi pattern is relatively strong, with multiple prominent lobes. FIG. 7B depicts a chart showing two-dimensional E-theta and E-phi patterns for straight slot element 306 of FIG. 3 under certain conditions in the XZ plane (phi=0 degrees). FIG. 7C depicts a chart showing two-dimensional E-theta and E-phi patterns for straight slot element 306 of FIG. 3 under certain conditions in the YZ plane (phi=90 degrees).

The present disclosure may be employed to test straight slot element 308 independently of straight slot 306. FIGS. 8A-8C depict two-dimensional E-theta and E-phi patterns for straight slot element 308 of FIG. 3 under certain conditions. FIG. 8A depicts a chart showing two-dimensional E-theta and E-phi patterns for straight slot element 306 of FIG. 3 under certain conditions in the XY plane. FIG. 8B depicts a chart showing two-dimensional E-theta and E-phi patterns for straight slot element 306 of FIG. 3 under certain conditions in the XZ plane. FIG. 8C depicts a chart showing two-dimensional E-theta and E-phi patterns for straight slot element 306 of FIG. 3 under certain conditions in the YZ plane.

The present disclosure may be employed to test straight slot element 310 independently of straight slots 306, 308. FIGS. 9A-9C depict two-dimensional E-theta and E-phi patterns for straight slot element 310 of FIG. 3 under certain conditions. FIG. 9A depicts a chart showing two-dimensional E-theta and E-phi patterns for straight slot element 306 of FIG. 3 under certain conditions in the XY plane. FIG. 9B depicts a chart showing two-dimensional E-theta and E-phi patterns for straight slot element 306 of FIG. 3 under certain conditions in the XZ plane. FIG. 9C depicts a chart showing two-dimensional E-theta and E-phi patterns for straight slot element 306 of FIG. 3 under certain conditions in the YZ plane.

The present disclosure may be employed to test straight slot element 312 independently of straight slots 306, 308, 310. FIGS. 10A-10C depict two-dimensional E-theta and E-phi patterns for straight slot element 312 of FIG. 3. FIG. 10A depicts a chart showing two-dimensional E-theta and E-phi patterns for straight slot element 306 of FIG. 3 under certain conditions in the XY plane. FIG. 10B depicts a chart showing two-dimensional E-theta and E-phi patterns for straight slot element 306 of FIG. 3 under certain conditions in the XZ plane. FIG. 10O depicts a chart showing two-dimensional E-theta and E-phi patterns for straight slot element 306 of FIG. 3 under certain conditions in the YZ plane.

It should be recognized that at least some of the various arrangements set forth in the Figures of the present application may comprise a number of variations and modifications, in hardware, software, firmware, or in any combination, usually in association with a processing system where needed, as components configured to perform specific functions. Accordingly, the arrangements of the Figures should be taken as illustrative rather than limiting with respect to the embodiments of the present patent application.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A multiple input multiple output (MIMO) antenna apparatus, comprising:
    a planar conductive layer disposed on a non-conductive layer of a printed circuit board;
    a plurality of antenna slot elements confined to a peripheral section surrounding a central region of the printed circuit board, each antenna slot element of at least a first group of the plurality of antenna slot elements having a respective signal feed port coupled thereto;
    a first transceiver configured to be selectively coupled to any one or more of the respective signal feed ports; and
    a second transceiver configured to be selectively coupled to any one or more of the respective signal feed ports,
    wherein a first antenna slot element of the first group of antenna slot elements has a first polarization and is disposed along a first edge of the printed circuit board.

2. The MIMO antenna apparatus of claim 1, wherein a second antenna slot element of the first group of the plurality of antenna slot elements has a second polarization and is disposed along the first edge of the printed circuit board.

3. The MIMO antenna apparatus of claim 1, wherein a second antenna slot element of the first group of the plurality of antenna slot elements has a second polarization and is disposed along a second edge of the printed circuit board opposite the first edge.

4. The MIMO antenna apparatus of claim 1, wherein a second antenna slot element of the first group of the plurality of antenna slot elements has a second polarization and is disposed along a second edge of the printed circuit board that is perpendicular to the first edge.

5. The MIMO antenna apparatus of claim 1, wherein the plurality of slot elements comprise any of straight slot elements, T-slot elements, L-slot elements, T-and-slot elements, and Y-slot elements.

6. The MIMO antenna apparatus of claim 1, wherein the first antenna slot element comprises a straight antenna slot element disposed on the first edge of the printed circuit board and a second antenna element comprises a straight antenna slot element disposed on a second edge of the printed circuit board that is different from the first edge.

7. The MIMO antenna apparatus of claim 6, wherein the printed circuit board comprises a rectangle having four sides, the first group of antenna slot elements comprising four straight antenna slot elements, each opening on a respective side of the printed circuit board and extending along a respective adjacent side of the printed circuit board.

8. The MIMO antenna apparatus of claim 1, wherein the first antenna slot element comprises an L-slot antenna element having a longer internal leg substantially aligned to the first edge of the printed circuit board.

9. The MIMO antenna apparatus of claim 8, wherein the first group of antenna slot elements comprises a second L-slot element having a longer internal leg substantially aligned to the a second edge of the printed circuit board opposite the first edge.

10. The MIMO antenna apparatus of claim 1, wherein each signal feed port comprises a pair of contacts disposed on opposite sides of a respective antenna slot element.

* * * * *